US 8,041,836 B1

United States Patent
Starkovich et al.

(10) Patent No.: US 8,041,836 B1
(45) Date of Patent: Oct. 18, 2011

(54) AUTOMATIC COBOL WORKING STORAGE TO OPEN/OLTP VIEW CONVERSION

(75) Inventors: Daniel P. Starkovich, Brooklyn Park, MN (US); Scott L. Rappa, Lino Lakes, MN (US); Joey L. Erickson, New Brighton, MN (US); Richard P. Campbell, Blaine, MN (US)

(73) Assignee: Unisys Corporation, Blue Bell, PA (US)

( * ) Notice: Subject to any disclaimer, the term of this patent is extended or adjusted under 35 U.S.C. 154(b) by 2522 days.

(21) Appl. No.: 10/132,940

(22) Filed: Apr. 26, 2002

(51) Int. Cl.
   *G06F 15/16* (2006.01)
(52) U.S. Cl. ......... 709/246; 709/201; 709/204; 709/217
(58) Field of Classification Search .................. 717/136; 707/4; 709/201–207, 217–219, 246
   See application file for complete search history.

(56) References Cited

U.S. PATENT DOCUMENTS

| | | | | |
|---|---|---|---|---|
| 5,432,930 A | * | 7/1995 | Song | 707/4 |
| 5,640,550 A | * | 6/1997 | Coker | 707/4 |
| 6,003,039 A | * | 12/1999 | Barry et al. | 707/103 R |
| 6,272,675 B1 | * | 8/2001 | Schrab et al. | 717/100 |
| 6,529,909 B1 | * | 3/2003 | Bowman-Amuah | 707/10 |
| 2001/0025372 A1 | * | 9/2001 | Vermeire et al. | 717/7 |
| 2002/0046294 A1 | * | 4/2002 | Brodsky et al. | 709/246 |

OTHER PUBLICATIONS http://www.zois.co.uk/index.html, printed May 18, 2007 at 03:03PM.*

* cited by examiner

*Primary Examiner* — Thu Nguyen
*Assistant Examiner* — Julian Chang
(74) *Attorney, Agent, or Firm* — Robert P. Marley; Nawrocki, Rooney & Sivertson, P.A.

(57) ABSTRACT

A system and method which automatically converts COBOL data definitions into view files which allows a user from an Internet terminal to access an On-Line Transaction Processing (OLTP) enterprise server. This conversion permits the Internet user to perform COBOL transactions using the enterprise legacy system.

20 Claims, 6 Drawing Sheets

Open/OlTP View File Generated

```
         COBOL WORKING STORAGE:        VIEW PETS
                                        # type    cname    fbname    count    flag    size    null
01  PETS                                  char    CAT1      --        06       --      --      --
    03  FILLER              PIC X(54).    char    BIRD11    --        5        --      --      --
    03  DOG OCCURS 2 TIMES                char    FISH11    --        4        --      --      --
        05  CAT             PIC X(06).    char    BIRD12    --        5        --      --      --
        05  MOUSE OCCURS 2 TIMES          char    FISH12    --        4        --      --      --
            07  BIRD        PIC X(5).     char    PUPPY1    --        4        --      --      --
            07  FISH        PIC 9999.     char    CAT2      --        06       --      --      --
        05  PUPPY           PIC ZZZZ.     char    BIRD21    --        5        --      --      --
    03  KITTEN              PIC 999.      char    FISH21    --        4        --      --      --
                                          char    BIRD22    --        5        --      --      --
                                          char    FISH22    --        4        --      --      --
                                          char    PUPPY2    --        4        --      --      --
                                          char    KITTEN    --        3        --      --      --
                                        END
```

| Client Programming Language | Variable Type In Open Distributed Transaction Processing VIEW | Variable Type In OS 2200 Language |
|---|---|---|
| C | carray | char |
|   | char | char |
|   | double | double |
|   | float | float |
|   | int | int |
|   | long | long |
|   | short | short |
| COBOL-74 | char | PIC X(n) |
|   | long | PIC S9(9) COMP |
|   | short | PIC S9(4) COMP |
| COBOL-85 | char | PIC X(n) |
|   | long | PIC S9(9) COMP-5 |
|   | short | PIC S9(4) COMP-5 |

FIG. 4

COBOL WORKING STORAGE:

```
01 PETS
   03  FILLER                          PIC X(54).
   03  DOG OCCURS 2 TIMES
       05  CAT                         PIC X(06).
       05  MOUSE OCCURS 2 TIMES
           07  BIRD                    PIC X(5).
           07  FISH                    PIC 9999.
       05  PUPPY                       PIC ZZZZ.
   03  KITTEN                          PIC 999.
```

FIG. 5A

Open/OLTP View File Generated

VIEW PETS

| # type | cname | fbname | count | flag | size | null |
|---|---|---|---|---|---|---|
| char | CAT1 | -- | 06 | -- | -- | -- |
| char | BIRD11 | -- | 5 | -- | -- | -- |
| char | FISH11 | -- | 4 | -- | -- | -- |
| char | BIRD12 | -- | 5 | -- | -- | -- |
| char | FISH12 | -- | 4 | -- | -- | -- |
| char | PUPPY1 | -- | 4 | -- | -- | -- |
| char | CAT2 | -- | 06 | -- | -- | -- |
| char | BIRD21 | -- | 5 | -- | -- | -- |
| char | FISH21 | -- | 4 | -- | -- | -- |
| char | BIRD22 | -- | 5 | -- | -- | -- |
| char | FISH22 | -- | 4 | -- | -- | -- |
| char | PUPPY2 | -- | 4 | -- | -- | -- |
| char | KITTEN | -- | 3 | -- | -- | -- |

END

AUTOMATIC COBOL WORKING STORAGE TO OPEN/OLTP VIEW CONVERSION

CROSS REFERENCE TO CO-PENDING APPLICATIONS

The present application is related to U.S. patent application Ser. No. 09/164,759, filed Oct. 1, 1998, and entitled "A COMMON GATEWAY WHICH ALLOWS APPLETS TO MAKE PROGRAM CALLS TO OLTP APPLICATIONS EXECUTING ON AN ENTERPRISE SERVER"; U.S. patent application Ser. No. 09/164,932, filed Oct. 1, 1998, entitled "A MULTI-CLIENT USER CUSTOMIZED DCOM GATEWAY FOR AN OLTP ENTERPRISE SERVER APPLICATION"; and U.S. patent application Ser. No. 09/164,822, filed Oct. 1, 1998, entitled MAKING CGI VARIABLES AND COOKIE INFORMATION AVAILABLE TO AN OLTP SYSTEM; which are assigned to the assignee of the present invention and incorporated herein by reference.

BACKGROUND OF THE INVENTION

1. Field of the Invention

The present invention relates to processing of Adapter-Based service requests, and more specifically, to a technique for automatic conversion of COBOL data definitions received from a Web-Based client into a format for honoring by an enterprise based OLTP data base management system.

2. Description of the Prior Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the web browser. Web browsers have become a de facto user interface standard because of their ability to interpret and display information having standard formats (e.g., HyperText Markup Language (HTML), standard test, GIF, etc.). Client software programs, popularly referred to as web browsers (e.g., Mosaic, Netscape Navigator, Microsoft Internet Explorer, etc.), execute on client systems and issue requests to server systems. The server systems typically execute HyperText Transport Protocol (HTTP) server programs which process requests from the web browsers and deliver data to them. The system that executes an HTTP server program and returns data to the web browser will hereinafter be referred to as a Web Server System. An HTTP server program itself will be referred to as a web server.

A Web Server System has access to on-line documents that contain data written in HyperText Markup Language (HTML). The HTML documents contain display parameters, capable of interpretation by a web browser, and references to other HTML documents and web servers (source: World Wide Web: Beneath the Surf, from UCL Press, by Mark Handley and Jon Crowcroft.

As web browsers are making their mark as a "standard" user interface, many businesses have a wealth of information that is managed by prior art data base management systems such as DMS, RDMS, DB2, Oracle, Ingres, Sybase, Informix, and many others. In addition, many of the database management systems are available as resources in a larger transaction processing system. There are also mission critical applications which still reside on enterprise servers, since these type of systems have resiliency and recovery features historically not available on other smaller types of servers.

One key to the future success of a business may lie in its ability to capitalize on the growing prevalence of web browsers in combination with selectively providing access to the data that is stored in its databases. Common Gateway Interface (CGI) programs are used to provide web browser access to such databases.

The Common Gateway Interface (CGI) is a standard for interfacing external applications, such as web browsers, to obtain information from information servers, such as web servers. The CGI allows programs (CGI programs) to be referenced by a web browser and executed on the Web Server System. For example, to make a UNIX database accessible via the World Wide Web, a CGI program is executed on the Web Server System to: 1) transmit information to the database engine; 2) receive the results from the database engine; and 3) format the data in an HTML document which is returned to the web browser. CGI variables typically include information such as the IP address of the browser, or the port number of the server.

One of the most widely utilized languages in preexisting legacy systems is COBOL. Because it by definition is a common business oriented language, COBOL is virtually embedded into the very foundations of day-to-day business procedures for many companies having enterprise data base management systems. As such businesses convert to Web-based applications for certain newer functions, it becomes a difficult manual procedure to marry such new applications to the preexisting legacy system.

SUMMARY OF THE INVENTION

The present invention overcomes many of the disadvantages associated with the prior art by providing a system and method which automatically converts COBOL working storage definitions into Open/OLTP view files. The resultant files can then be used with the commercially available Transaction Integrator to access legacy mainframe applications. The present invention passes a data buffer between a Personal Computer (PC) based web browser and an enterprise OLTP server via web server, WebTx server and transaction gateway interface components.

The present invention employs a Visual Basic program which parses a COBOL working storage definition and generates an Open/OLTP view file. The preferred mode uses a graphical user interface to select the COBOL working storage definition file. This file must contain a valid COBOL working storage definition in ASCII text format.

The Visual Basic program script of the preferred embodiment automatically converts this valid selected COBOL working storage definition into a view file. The view file is applied to the Transaction Integrator middleware commercially available from Unisys Corporation which processes the contents of the automatically generated view file utilizing the legacy data base management system.

Thus, in accordance with the present invention, a user can communicate between an Internet terminal and the legacy data base management system using COBOL data definitions without the need to manually adapt them for effecting the transition. This automatic conversion saves a great deal of development time and effort, as well as preventing difficulties resulting from human conversion errors.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
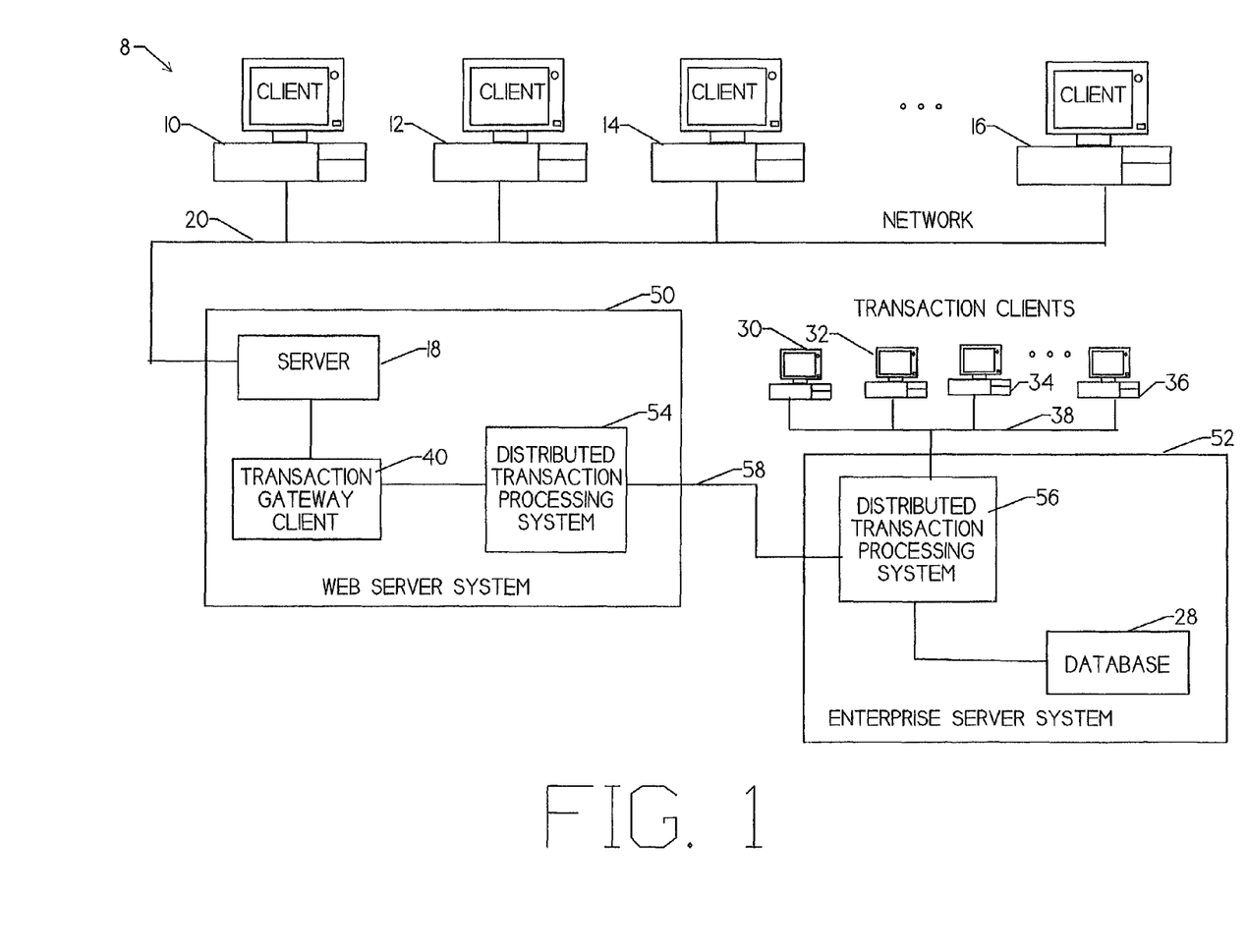
FIG. 1 is generalized block diagram of components utilized by the current invention, including a step-by-step illustration of a transaction as it proceeds through the components of the system.

FIG. 1 is a functional block diagram of an exemplary computing environment in which the present invention could be used to make an enterprise based transaction processing system interoperable with a PC/Workstation based requestor. A plurality of PC/Workstations, designated as Clients 10, 12, 14, and 16 are coupled to a Server 18 via Network 20. The Network 20 may be an internal local area network or the Internet.

Each of the Clients 10, 12, 14, and 16, is a Personal Computer/Workstation having operating system software and application software designed to provide Graphical User Interface (GUI) and communications capabilities which enable the Client to communicate with an associated Server application 18 via a Network 20.

The Workstation Server System 50 may be any class of machine(s) which is capable of running a Server application 18 along with a Distributed Transaction Processor 54. The Transaction Processing system 54 is designated as Distributed to make clear that a transaction is formatted on the Workstation Server System 50 and forwarded to the Enterprise Server system 52 for processing. As is explained in further detail below, Distributed Transaction Processing System 54 contains the Queued Transaction connector and the input and output queues required to practice the preferred mode of the present invention.

The exemplary Enterprise Server System 52 is a 2200 Series data processing system from Unisys and also includes a Distributed Transaction Processing System 56. The Distributed Transaction Processing System 56 is intended to encompass the same functionality as a monolithic transaction processing system, however, it is designated as Distributed to be compatible with the Distributed Transaction Processing System 54. The exemplary Distributed Transaction Processing Systems 54 and 56 are intended to encompass transaction manager software, such as Open/OLTP Transaction Manager software from Unisys, and user implemented Open/OLTP services. The Distributed Transaction Processing System 54 and the Distributed Transaction Processing System 56 are coupled via Network 58. Preferably, the network interface for Network 58 is separate from the network interface for Network 20.

The Distributed Transaction Processing System 56 serves data from the Database 28 to the Transaction Clients 30, 32, 34, and 36. The Transaction Clients 30, 32, 34, and 36 are coupled to the Distributed Transaction Processing System 56 via line 38, of which the underlying technology is driven by the application of the Distributed Transaction Processing System 56.

The Transaction Gateway Client 40 allows the Server 18 to interoperate with the Transaction Processing System. When a Client 10, 12, 14, or 16 selects an enterprise based service, the request is routed to the Server 18, which in turn routes the request to the Transaction Gateway Client 40. The Transaction Gateway Client 40 determines the requested service and forwards the necessary information to the Distributed Transaction Processing System 54 and 56. The Distributed Transaction Processing System 54 and 56 processes the request against the Database 28 according to the specified request (e.g., select, update, delete). The Distributed Transaction Processing System 54 and 56 returns data and/or status information to the Transaction Gateway Client 40, which in turn formats the data in an appropriate manner for the Server 18. The Server 18 then returns the information to the requesting Client 10, 12, 14, and 16.

Figure 2:
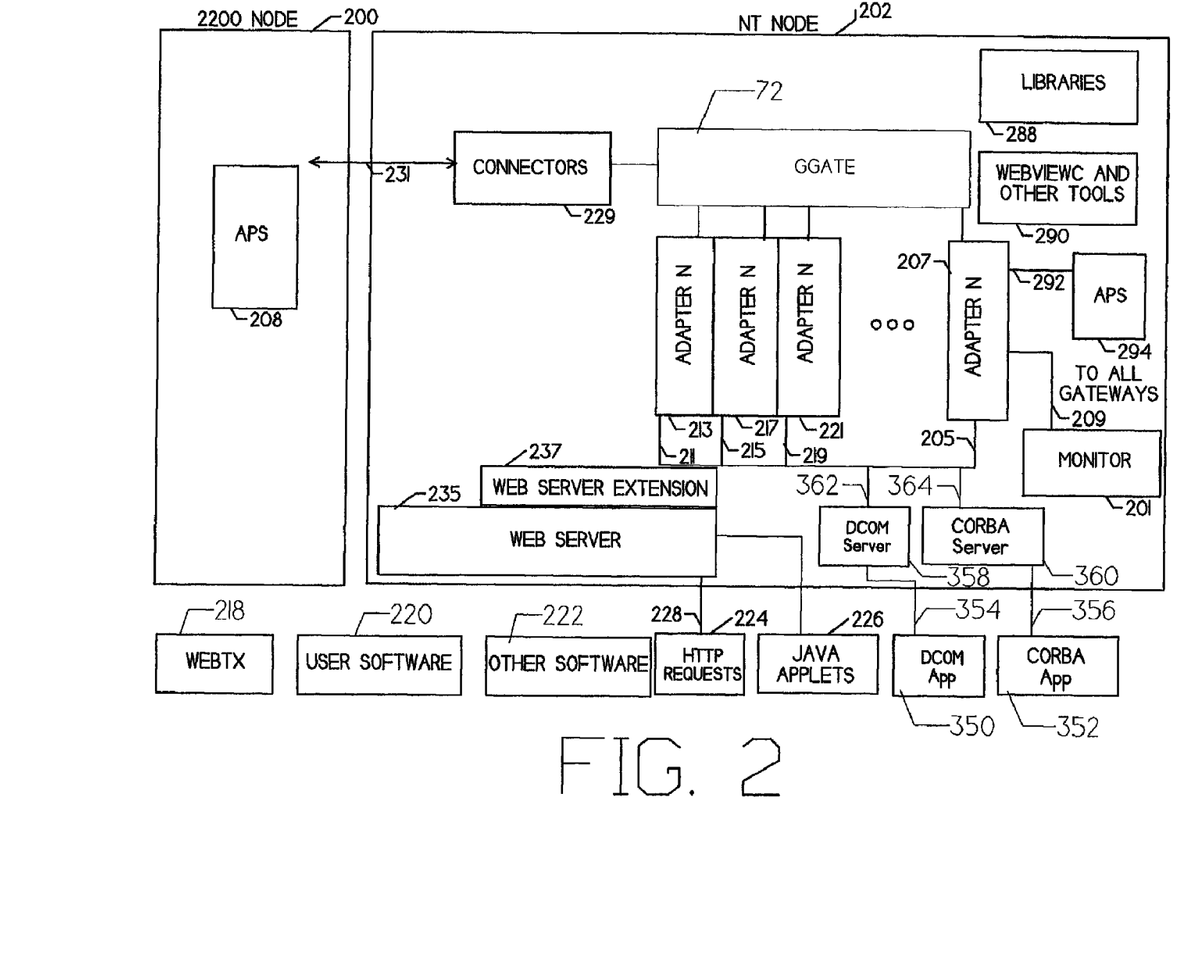
FIG. 2 is a functional block diagram of the computing environment in which the present invention resides.

FIG. 2 is a functional block diagram of a generalized environment suitable for incorporating the present invention. In general, this is middleware in a client/server computing environment which accepts requests from the client side and routes the requests to the correct place on the server side, then passes a response from the serve side back to the client side. In the context of the present invention, a generic gate "marries" a Microsoft DCOM server client/server architecture (such as the NT node shown in 202) with transactional client/server architecture (such as the Unisys 2200 enterprise node, as shown at 200).

The environment, as utilized in the present invention, is comprised of several components, including a Monitor 201, a Web Server Extension 237, a plurality of adapters 213, 217, 221, and 207, GGATE 72, a plurality of connectors 229, the WebViewC compiler 290, and a set of libraries 288.

The Monitor 201 functions as the WebTx administrative tool. One function of the Monitor 201 is to direct service requests to the adapters 84, 86, 88, and 207, as appropriate. Within a Unix environment, the monitor module is known as WebMon, while under the Windows NT environment, the WebTx monitor module is known as WtxSvc.

The DCOM server 358 and CORBA server 360 intercept requests intended for WebTx 218, and instead route the requests to the adapters 84, 86, 88, and 207. The DCOM server 358 and CORBA server 36o will also interpret the response from the GGAIE 72, and route the reply. The Web Server Extension is connected to the Monitor 201 via interface 203, an HTML requestor component 224 via interface 228, and a Java Applet 226 via interface 234.

The GGATE 72 is a generic gateway which performs tasks which are grouped into conceptual areas. It receives service requests from the adapters and takes whatever action is necessary to fulfill the request. This typically involves transforming a request (such as a URL from a Web Browser or remote procedure calls RPC's from a DCOM client) into a format which is understandable by a Distributed Transaction Processing System such as a Unisys 2200 Enterprise System 200. GGATE 72 also transforms data returned from the Distribute Transaction Processing System Zoo into a formatted response which is returned to the requestor.

The WebVIewC compiler 290 is used in conjunction with specific GGATE requirements, such as ViewGate, TUXGate, and JGate. The WebViewC compiler 290 compiles Open/OLTP view files generated on the OLTP enterprise system to create WebTx view files (.wv) and HTML files (.html). The WebViewC compiler is a free-standing component with no direct communication to any of the other components within the WebTx environment.

Other Components include libraries 288 such as the Software Development Kit (SDK) libraries, which provide framework and functions for building Custom Gateways. The SDK is specifically designed to allow customers to build their own gateways. Another type of library present within the WebTx system are Java Class Libraries, which provide class definitions for building JavaGate compatible applets.

Another tool 290 that may exist as a component is DGateAce. DGateAce is analogous to WebViewC, and is used specifically in conjunction with DGate, as part of the Unisys Pathmate system.

Unix WebTx users Inter-Process Communications (IPC) objects such as semaphores, shared memory, message queues and signals, while NT WebTx uses IPC objects such as handles, pipes, mutexes, and events.

Figure 3:
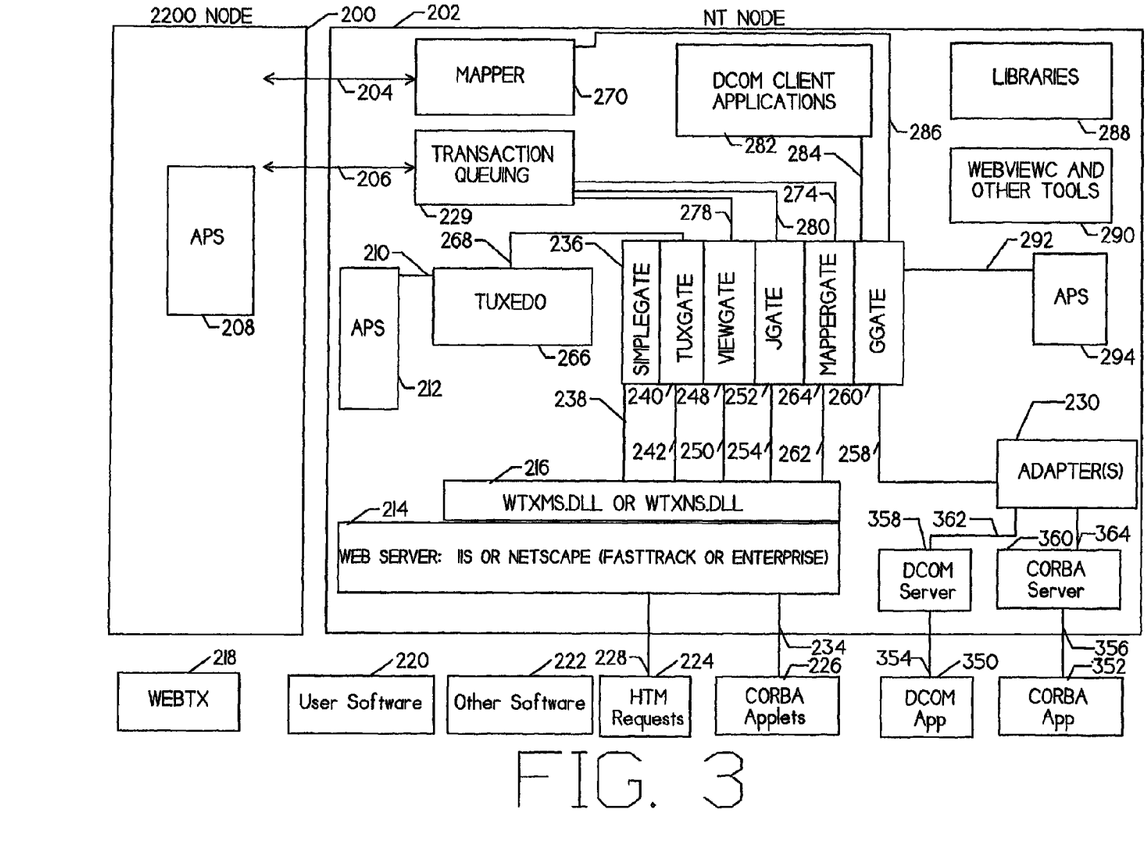
FIG. 3 is a block diagram showing the flow through the components of the computing environment.

FIG. 3 is a functional block diagram of WebTx components utilized within the Microsoft NT environment. This figure shows specific Gateway implementations within the Window NT node. The SimpleGate Gateway 236 is specifically utilized as a test tool. It merely echoes a request. The TUXGate Gateway 240 provides generalized access to OLTP services through BEA TUXEDO 266. BEA TUXEDO acts as the hub for a distributed enterprise and Internet 3-tier applications. It provides an open environment that supports a wide variety of clients, databases, networks, legacy systems, and communications options. The FileGate Gateway 244 works in conjunction with a specific OLTP service to access textual files on the Unisys 2200 node. ViewGate 248 provides generalized access to OLTP services on the Unisys 2200 note (specifically HTML output). JGate 252 provides generalized Java applet access to OLTP services on the Unisys 2200 node. The DGate Gateway 256 provides generalized DCOM access to OLTP services on the Unisys 2200 node. The MapperGate Gateway 260 provides generalized access to MAPPER applications within the Microsoft Windows NT environment. A Custom Gateway, such as shown at 264, provide a way for a customer to build their own Gateway to interface their own applications to an OLTP enterprise application.

Figure 4:
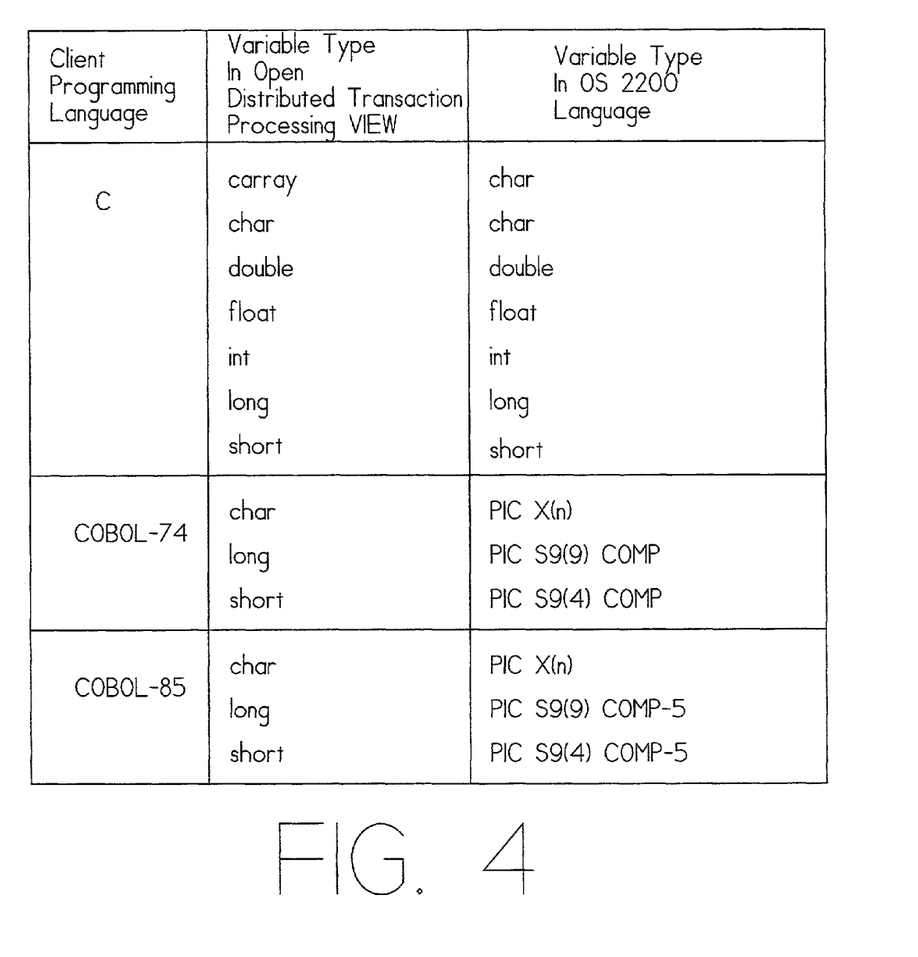
FIG. 4 illustrates the general format of header translation.

FIG. 4 is a table showing the translation of input headers. The translation is shown for input languages "C", COBOL-74, and COBOL-85.

Figure 5A:
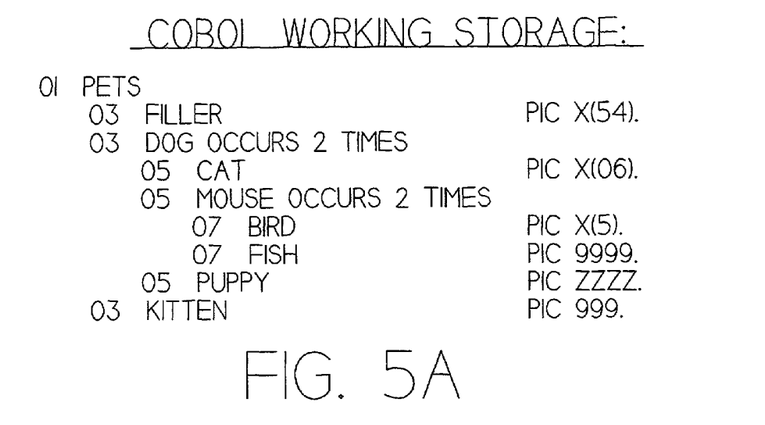
FIG. 5A shows an example of a COBOL working storage input to the present invention.

FIG. 5A is a table showing a typical COBOL data definition input to the preferred mode of the present invention. This is the type of data definition presented at element 414 (see also FIG. 5).

Figure 5B:
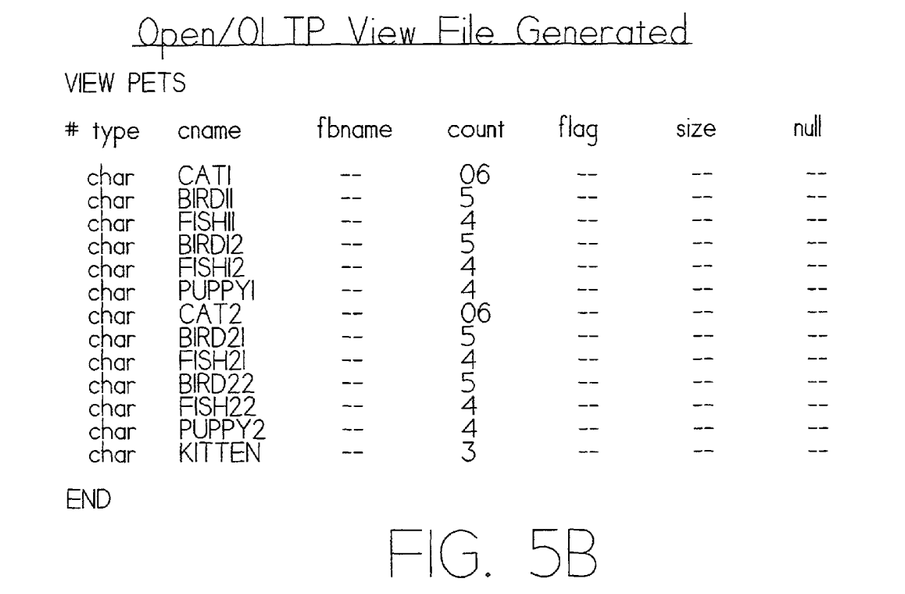
FIG. 5B shows the view file generated for the sample COBOL working storage of FIG. 5A.

FIG. 5B is a table showing the converted view file corresponding to the example of FIG. 9A. This sample corresponds to element 408 (see also FIG. 5).

Figure 6:
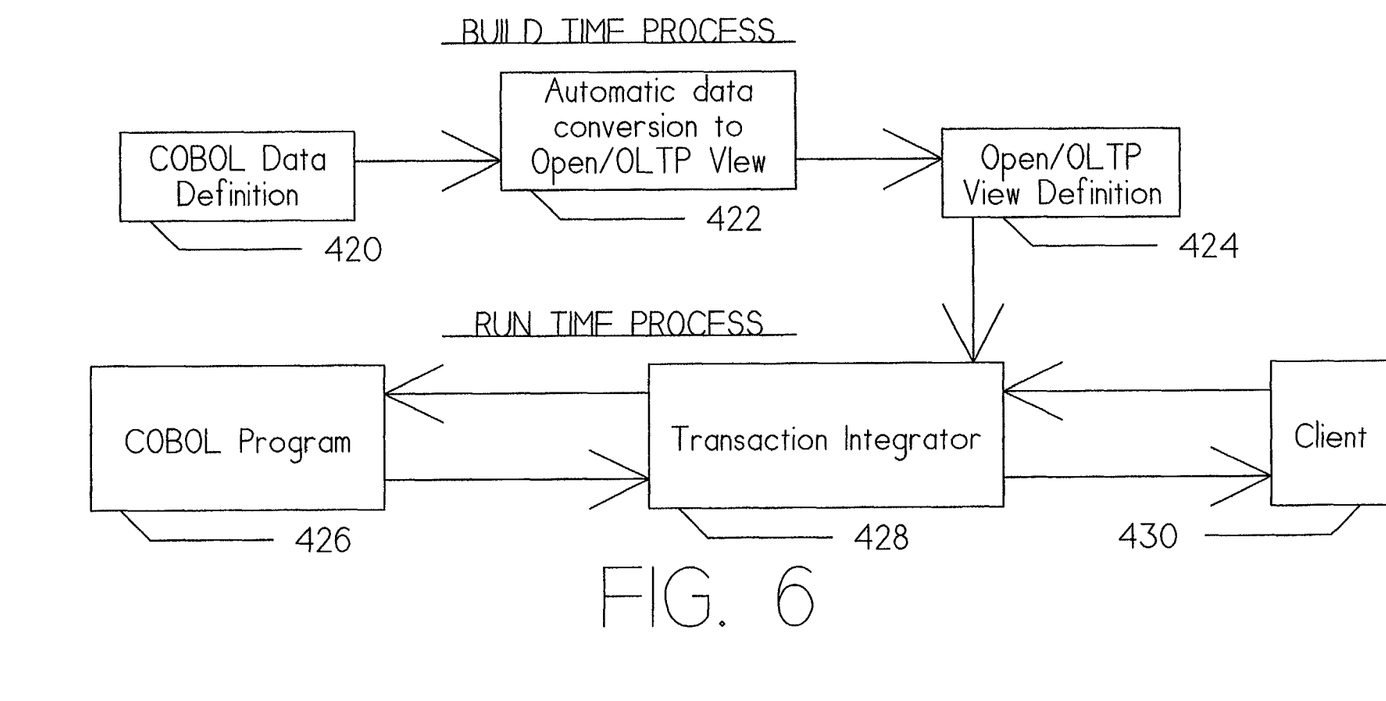
FIG. 6 is a detailed flow diagram of the build and execute processes of the preferred mode of the present invention.

FIG. 6 is a flow diagram showing operation of the preferred mode of the present invention as separated into build time and run time activities. During build time, the COBOL data definition 420 (see FIG. 9A for an example) is presented to the automatic data conversion software 422. As a result, the view file is created at element 424 (see also FIG. 5).

During run time, COBOL program 426 interacts with Transaction Integrator 428 as shown. Both of these elements are commercially available from Unisys Corporation. Interaction between Transaction Integrator middleware 428 and client 430 is defined in greater detail above.

Having thus described the preferred embodiments of the present invention, those of skill in the art will readily appreciate that the teachings found herein may be applied to yet other embodiments within the scope of the claims hereto attached.

We claim:
1. A data processing system comprising:
   a. a first computer functioning as an Internet terminal which generates a COBOL service request having COBOL data definitions according to a first format;
   b. a second computer hosting an enterprise-based On-Line Transaction Processing (OLTP) System responsively coupled to said first computer via the Internet containing a COBOL facility which honors said COBOL service request in accordance with a second format; and
   c. a converter responsively coupled to said Internet terminal and said COBOL facility for translating said COBOL service request from said first format into said second format suitable for said COBOL facility.
2. A data processing system according to claim 1 wherein said format suitable for said COBOL facility further comprises an Open/OLTP view file.

3. A data processing system according to claim 2 wherein said COBOL data definitions further comprises COBOL working storage definitions.

4. A data processing system according to claim 3 wherein said converter prepares said view file from said COBOL data definitions.

5. A data processing system according to claim 4 wherein said enterprise-based On-Line Transaction Processing (OLTP) System further comprises Transaction Integrator middleware.

6. An apparatus comprising:
   a. a first computer providing an Internet terminal which generates a COBOL service request having a COBOL data definition in a first format;
   b. a second computer containing an enterprise-based data base management system having a COBOL facility which processes said COBOL service request in a second format responsively coupled to said first computer via the Internet; and
   c. a converter responsively coupled to said Internet terminal and said COBOL facility which converts said COBOL service request from said first format to said second format.

7. An apparatus according to claim 6 wherein said first format further comprises a COBOL working storage definition.

8. An apparatus according to claim 7 wherein said second format further comprises a view file.

9. An apparatus according to claim 8 wherein said converter prepares said view file in accordance with said COBOL data definition.

10. An apparatus according to claim 9 wherein said first computer containing said enterprise On-Line Transaction Processing (OLTP) system is a Unisys 2200 series mainframe computer.

11. A method of processing a COBOL service request comprising:
   a. generating said COBOL service request having COBOL data definitions in a first format at an Internet terminal;
   b. transferring said COBOL service request to an enterprise-based legacy data base management system having a COBOL facility which honors said COBOL service request in a second format via the Internet;
   c. converting said COBOL service request from said first format into said second format; and
   d. presenting said converted COBOL service request to said COBOL facility in said second format.

12. A method according to claim 11 wherein said first format further comprises a COBOL working storage definition.

13. A method according to claim 12 wherein said second format further comprises a view file.

14. A method according to claim 13 wherein converting step constructs said file corresponding to said COBOL data definition.

15. A method according to claim 14 wherein said enterprise-based legacy data base management system further comprises Unisys Translation Integrator middleware.

16. An apparatus comprising:
   a. transferring means for transferring a COBOL service request having COBOL data definitions in a first format via the Internet;
   b. receiving means responsively coupled to said transferring means for receiving said COBOL service request via the Internet;
   c. converting means responsively coupled to said receiving means for converting said COBOL service request into a second format; and
   d. honoring means responsively coupled to said converting means for honoring said converted COBOL service request using an enterprise-based legacy data base management system.

17. An apparatus according to claim 16 wherein said first format further comprises a COBOL working storage definition.

18. An apparatus according to claim 17 wherein said second format further comprises a view file.

19. An apparatus according to claim 18 wherein converting means further comprises a means for translating said COBOL data definition into said view file.

20. An apparatus according to claim 19 wherein said honoring means further comprises Unisys Translation Integrator middleware.

* * * * *